(12) United States Patent
Page et al.

(10) Patent No.: US 11,664,689 B2
(45) Date of Patent: May 30, 2023

(54) ELECTRICAL MACHINES

(71) Applicant: Hamilton Sundstrand Corporation, Charlotte, NC (US)

(72) Inventors: Andrew E. Page, Tring (GB); Tadashi Sawata, Coventry (GB); David Gerada, Beeston (GB); Dmitry Golovanov, Nottingham (GB); Zeyuan Xu, Glasgow (GB); Christopher Gerada, Nottingham (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 269 days.

(21) Appl. No.: 17/088,832

(22) Filed: Nov. 4, 2020

(65) Prior Publication Data

US 2021/0135516 A1    May 6, 2021

(30) Foreign Application Priority Data

Nov. 5, 2019   (EP) ..................... 19275117

(51) Int. Cl.
*H02K 1/20* (2006.01)
*H02K 3/12* (2006.01)
*H02K 5/20* (2006.01)
*H02K 9/19* (2006.01)

(52) U.S. Cl.
CPC ............... *H02K 1/20* (2013.01); *H02K 3/12* (2013.01); *H02K 5/203* (2021.01); *H02K 9/19* (2013.01)

(58) Field of Classification Search
CPC .................. H02K 5/20; H02K 9/19

USPC ........................................... 310/54
See application file for complete search history.

(56) References Cited

U.S. PATENT DOCUMENTS

| 7,705,496 | B2 | 4/2010 | Zisler et al. |
| 7,952,243 | B2 | 5/2011 | Sopp |
| 8,093,770 | B1 | 1/2012 | Berhan |
| 9,391,493 | B2 | 7/2016 | Leung et al. |
| 10,418,881 | B2 * | 9/2019 | Tamura ................. H02K 3/24 |
| 10,536,055 | B2 * | 1/2020 | Hanumalagutti ........ H02K 3/24 |
| 2010/0126703 | A1 | 5/2010 | Ruan et al. |

(Continued)

FOREIGN PATENT DOCUMENTS

| CN | 207968165 U | 10/2018 |
| CN | 109560656 A * | 4/2019 |

(Continued)

OTHER PUBLICATIONS

Machine translation of CN 109560656 A (Year: 2019) retrieved from internal office search engine.*

(Continued)

*Primary Examiner* — Ahmed Elnakib
*Assistant Examiner* — Minki Chang
(74) *Attorney, Agent, or Firm* — Cantor Colburn LLP

(57) ABSTRACT

A stator assembly for an electrical machine comprises an annular core extending around an axis (X) and comprising a plurality of axially extending slots. A plurality of electrical windings are arranged in the slots and have end portions arranged at the axial ends of the core. A cooling jacket at least partially extends around a radially outer surface of the core. At least one annular cooling plate is mounted to an axial end of the cooling jacket and arranged in thermal contact with the end portions of the electrical windings.

14 Claims, 5 Drawing Sheets

(56) References Cited

U.S. PATENT DOCUMENTS

| | | | | |
|---|---|---|---|---|
| 2012/0062056 A1* | 3/2012 | Bradfield | ............... | H02K 9/197 |
| | | | | 310/58 |
| 2012/0091838 A1* | 4/2012 | Miyamoto | ............... | H02K 5/20 |
| | | | | 310/54 |
| 2012/0286596 A1* | 11/2012 | Creviston | .............. | H02K 5/203 |
| | | | | 310/59 |
| 2018/0174098 A1 | 6/2018 | Andres et al. | | |

FOREIGN PATENT DOCUMENTS

| | | | | |
|---|---|---|---|---|
| CN | 109617272 A | * | 4/2019 | ............... H02K 1/20 |
| EP | 3163717 A1 | | 5/2017 | |
| WO | 2012154423 A2 | | 11/2012 | |

OTHER PUBLICATIONS

Chen et al., Year 2019, Machine translation of CN 109617272 A (Year: 2019).*
European Search Report for Application No. 19275117.0, dated Apr. 20, 2020, 8 pages.

* cited by examiner

ELECTRICAL MACHINES

FOREIGN PRIORITY

This application claims priority to European Patent Application No. 19275117.0 filed Nov. 5, 2019, the entire contents of which is incorporated herein by reference.

TECHNICAL FIELD

The present disclosure relates to electrical machines such as motors and generators and in particular to cooling such machines.

BACKGROUND

Electrical machines such as motors and generators generate heat during operation. As machine sizes increase, the heat generated in the machine increases, meaning that in many machines it is necessary to cool the machine to prevent overheating and also to maintain performance.

The main area of heat generation is in the stator windings and stator core. Some machines use air cooling, with fans blowing cooling air over the windings and core during use. Other machines use water cooling. An example of a water cooled machine is disclosed in U.S. Pat. No. 8,093,770 B1. In this document, a water jacket is provided around a stator, and a compliant cap formed over end portions of the stator winding. A cover is placed over the compliant cap, thereby forming a cooling channel around the end portions of the stator winding and through which a coolant may be circulated. However, such a construction presents challenges in manufacturing, assembly and testing.

SUMMARY

From a first aspect the present disclosure provides a stator assembly for an electrical machine. The stator assembly comprises an annular core extending around an axis and comprising a plurality of axially extending slots. A plurality of electrical windings are arranged in the slots. The windings have end portions arranged at the axial ends of the core. At least one annular cooling plate is mounted at an axial end of the core and is arranged in thermal contact with axial end surfaces of the end portions of the electrical windings.

The stator assembly may further comprise a cooling jacket which at least partially extends around a radially outer surface of the core, and the at least one cooling plate may be mounted to an axial end of the cooling jacket.

From a further aspect the present disclosure provides a stator assembly for an electrical machine. The stator assembly comprises an annular core extending around an axis and comprising a plurality of axially extending slots. A plurality of electrical windings are arranged in the slots. The windings have end portions arranged at the axial ends of the core. A cooling jacket at least partially extends around a radially outer surface of the core. At least one annular cooling plate is mounted to an axial end of the cooling jacket and arranged in thermal contact with the end portions of the electrical windings.

A respective cooling plate may be provided at each axial end of the stator.

The at least one cooling plate may be arranged in direct thermal contact with the end portions of the electrical windings.

The at least one cooling plate may comprise a cooling passage configured to carry a cooling fluid.

The at least one cooling plate may comprise a base element defining a groove and a cover attached to the base element for closing the groove to form the cooling passage.

The at least one cooling plate may comprise heat transfer enhancement features which extend into the cooling passage. The heat transfer enhancement features may extend partially or completely across the cooling passage.

The heat transfer enhancement features may comprise ribs and/or pin fins. The pin fins may comprise a square, rectangular, diamond shaped, oval or teardrop cross-section.

The at least one cooling plate may comprises at least one cooling fluid inlet and at least one cooling fluid outlet. The at least one fluid inlet may be located on a diametrically opposite side of the at least one cooling plate from the at least one fluid outlet.

The at least one cooling plate may be formed from aluminium.

The at least one cooling plate may be removably mounted to stator assembly, for example to the cooling jacket. The mounting may be by way of a fastener, for example a threaded fastener.

The disclosure also extends to an electrical machine incorporating a stator in accordance with the disclosure.

The disclosure also provides a method of assembling a stator assembly for an electrical machine, the stator assembly comprising an annular core extending around an axis and comprising a plurality of axially extending slots, a plurality of electrical windings arranged in the slots and having end portions at axial ends of the core. The method comprises mounting at least one annular cooling plate at an axial end of the core and in thermal contact with axial ends of the end portions of the electrical windings.

The stator assembly may comprise a cooling jacket at least partially extending around a radially outer surface of the core and the mounting may comprise mounting the at least one cooling plate to the axial ends of the cooling jacket.

The cooling jacket may comprise a radially inner base part and a radially outer cover part and the method may further comprise mounting the cover part to the base element after assembly of the core and windings to the radially inner base part.

The step of attaching the at least one cooling plate to the cooling jacket may comprise removably attaching the cooling plate to the cooling jacket for example using threaded fasteners.

The method may further comprise leak testing and/or electrically testing the assembled stator assembly after attaching the at least one cooling plate to the stator assembly, for example to the cooling jacket.

The method may further comprise removing the at least one cooling plate to carry out maintenance on the stator.

BRIEF DESCRIPTION OF DRAWINGS

An embodiment of the disclosure will now be described, by way of example only, with reference to the accompanying drawings in which.

DETAILED DESCRIPTION

Figure 1:
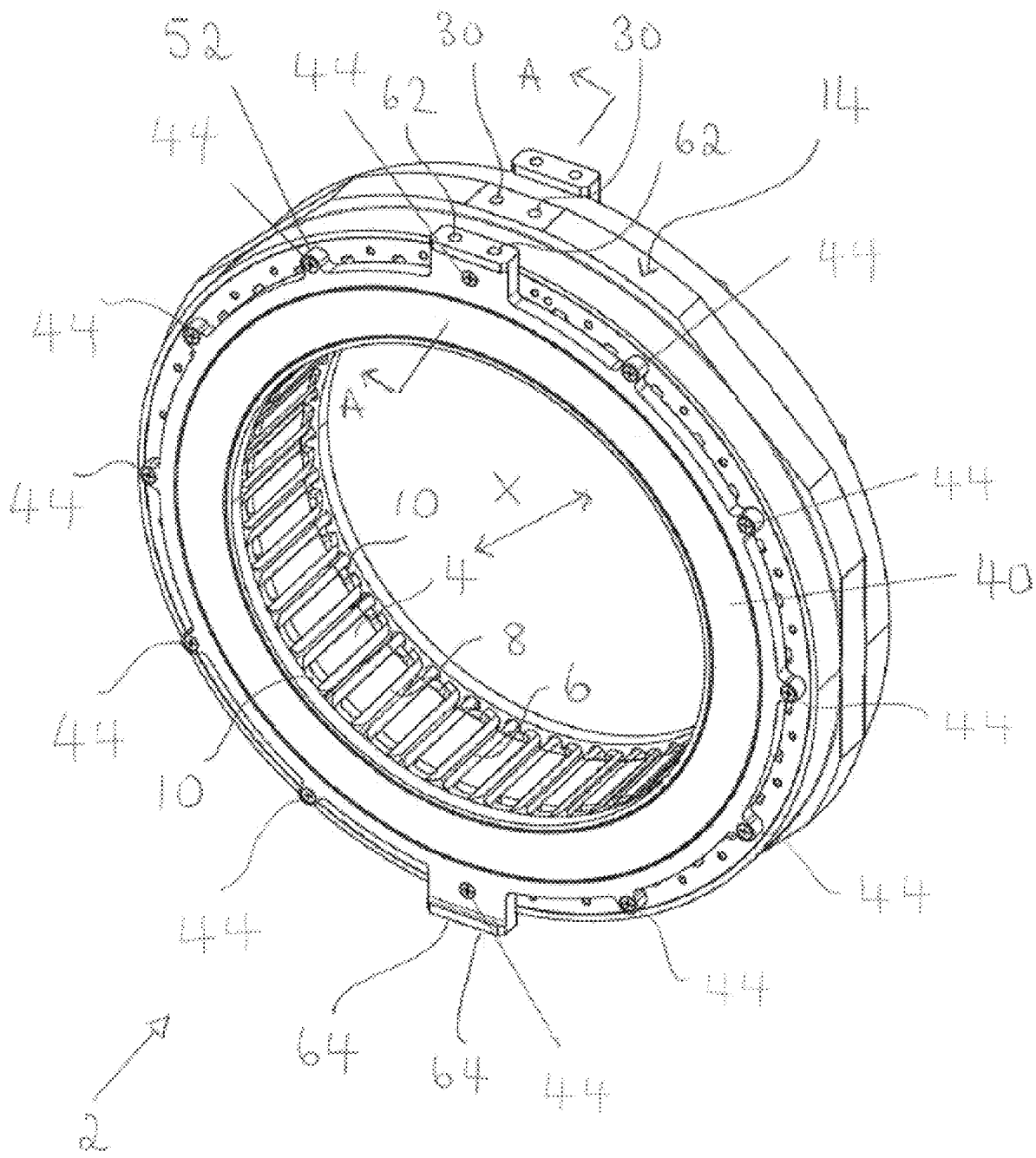
FIG. 1 shows a stator assembly in accordance with the disclosure.
Figure 2:
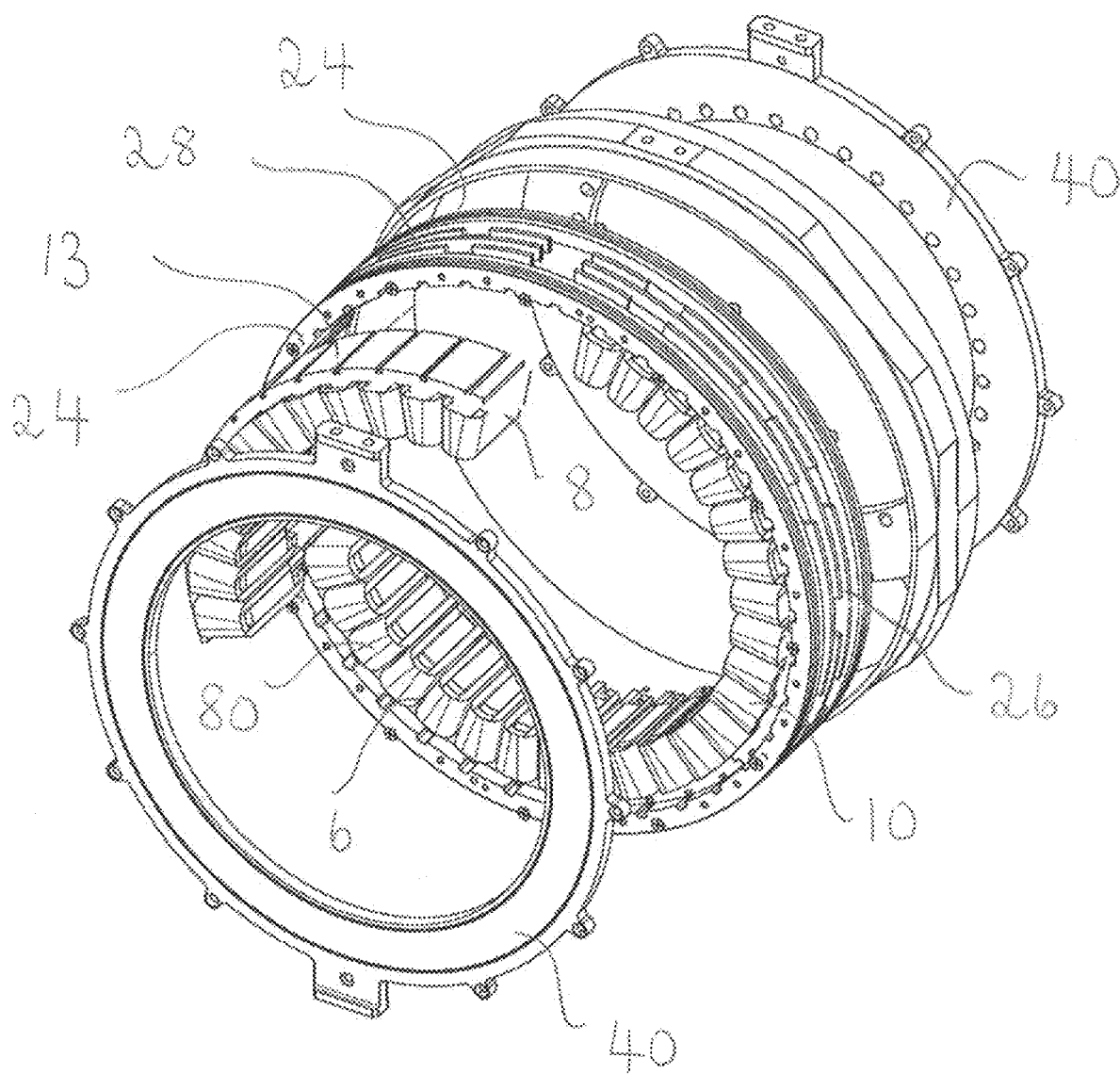
FIG. 2 shows an exploded view of the stator assembly of FIG. 1.

With reference to FIGS. 1 and 2, a stator 2 of an electrical machine is illustrated. In this embodiment, the machine is an electric motor. However, the principles of the disclosure may be applied to other electrical machines, for example generators.

The stator 2 comprises an annular core 4 which extends around a stator axis X. The core 4 comprises a plurality of axially extending slots 6 which receive windings 8. In this embodiment, the slots 6 extend parallel to the axis X, but in other embodiments, they may be angled relative thereto.

The windings 8 have end portions 10 at the axial ends 12 of the core 4 which pass between adjacent core slots 6.

The core 4 may be made as a unitary body or in one or more parts which are assembled together to form the core 4. Such an arrangement is illustrated in FIG. 2.

The core 4 is surrounded on a radially outer surface 13 by an annular cooling jacket 14. The cooling jacket 14 comprises an annular radially inner part 16 and an annular radially outer cover part 18 which define one or more coolant passages 20 therebetween for receiving a coolant. In an exemplary embodiment, the coolant passage 20 may be an annular coolant passage 20. The coolant may be a gaseous coolant such as air, but advantageously it may be a liquid coolant to improve heat transfer. A typical coolant may be water or water/glycol mixture.

Figure 3:
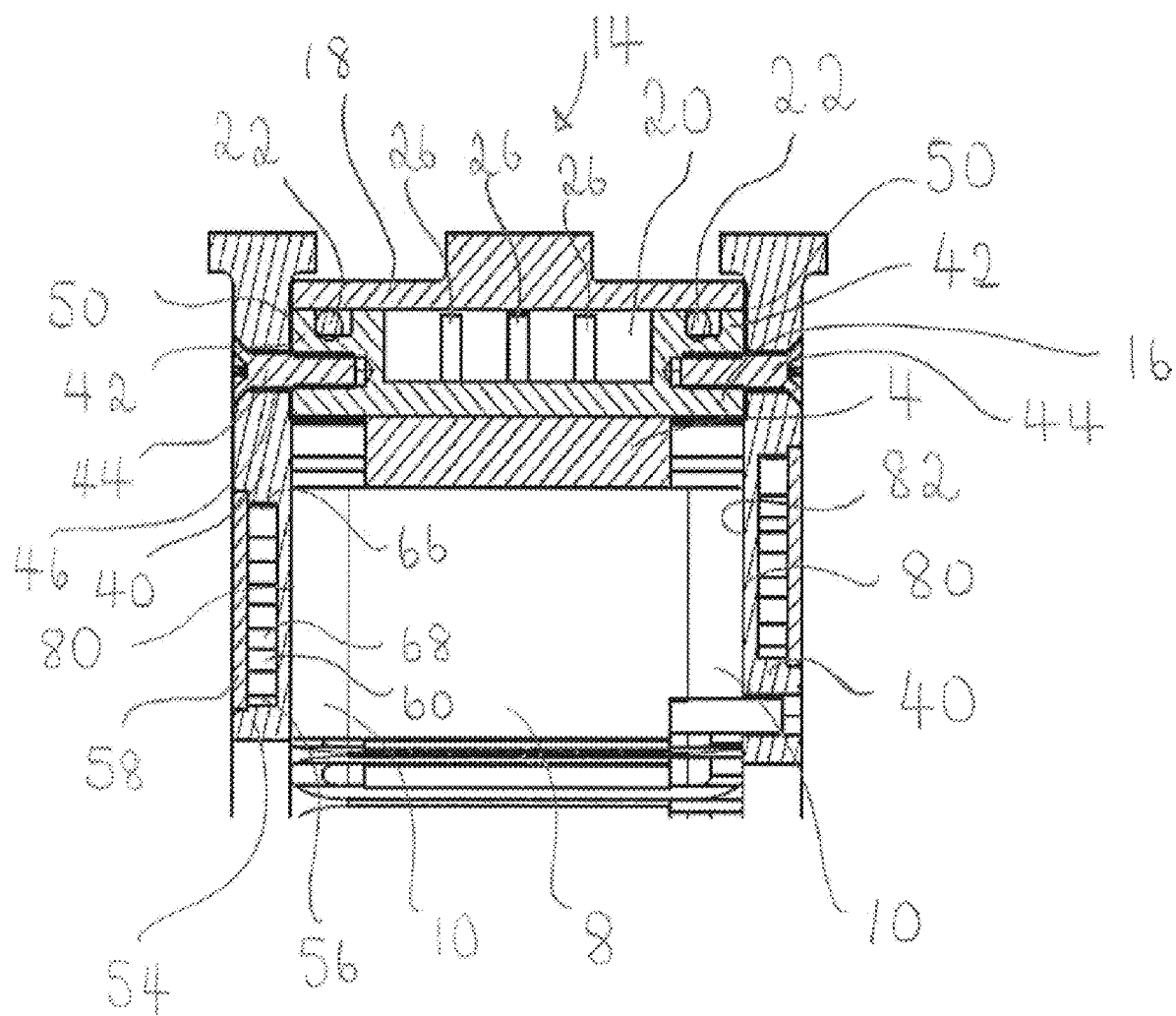
FIG. 3 shows a cross-section of the stator assembly of FIG. 1, taken along the line A-A.

As illustrated in FIG. 3, seals 22 such as O-ring seals 22 may be provided at opposed axial ends of the jacket 14 to prevent leakage of coolant from the coolant passage 20. The radially inner part 16 and radially outer part 18 of the jacket 14 may be secured together in any suitable manner, for example, through fasteners, welding or brazing.

The core 4 may be mounted to the radially inner part 16 of the water jacket 14 by any suitable means. For example, keys (not shown) may be used radially to locate the core 4 in the cooling jacket 14 and axial plates 24 locate the core 4 axially. However, this is just one possibility and the skilled person will recognise other mechanisms by which the core 4 can be mounted in the cooling jacket 14.

The cooling jacket 14 may, as shown, be formed with heat transfer enhancement features 26, to enhance heat transfer from the core 4 and windings 8 into the coolant. In this embodiment the heat transfer enhancement features 26 comprise a plurality of circumferentially extending ribs 28. However, other forms of heat transfer enhancement features 26 may be used, for example pin fins having a cross-sectional shape including, but not limited to, circular, square, rectangular, diamond, oval, or teardrop shapes. While heat transfer enhancement features 26 have been shown on the radially inner part 16 of the cooling jacket 14, such features 26 may be provided either alternatively or additionally on the radially outer part 18 of the jacket 14.

As illustrated in FIG. 1, the cooling jacket 14 may have one or more inlets 30 for admitting cooling fluid into the cooling passage 20. One or more outlets (not shown) for the cooling fluid may also be provided, for example diametrically opposite the inlets 30.

While the cooling jacket 14 provides some cooling to the core 4 and windings 8, additional cooling is provided by a pair of cooling plates 40 arranged at opposed axial ends 12 of the core 4.

The cooling plates 40 are mounted to respective axial ends 42 of the cooling jacket 14. In this embodiment, the cooling plates 40 are removably mounted to the jacket 14. This will allow the cooling plates 40 to be removed for maintenance or replacement purposes.

The cooling jacket 14 provides a robust support for the cooling plates 40 and provides a potential heat flow path from the cooling plates 40.

The cooling plates 40 may be directly mounted to the axial ends of the cooling jacket or via an intermediate component As shown, the cooling plates 40 may be mounted to the cooling jacket 14 by means of bolts or other threaded fasteners 44 passing through bores 46 in the cooling plates 40 into threaded openings 48 formed in the respective end faces 50 of the cooling jacket 14. As can be seen in FIG. 1 for example, a plurality of bolts 44 may be spaced around the external periphery of the cooling plate 40. The bores 46 may be formed in lugs 52 projecting radially from the cooling plates 40.

In as illustrated in this embodiment, the cooling plate 40 may comprise a base element 54 having an annular groove 56 which is closed by a cover plate 58. The base element 54 and cover plate 58 thereby define one or more cooling passages 60 through the cooling plate 40 for receiving a cooling fluid. The cooling fluid may be a gaseous coolant but advantageously it may be a liquid coolant to improve heat transfer. A typical coolant may be water or water/glycol mix.

The cooling passage 60 may be a continuous annular passage 60. In alternative embodiments, a plurality of annular passages may be formed. The skilled person will be able to envisage various arrangements of cooling passages 60 within the cooling plates 40.

One or more cooling fluid inlets 62 and one or more cooling fluid outlets 64 may be provided on each cooling plate 40. As illustrated, the cooling fluid inlets 62 and cooling fluid outlets 64 may be arranged on diametrically opposed sections of the cooling plate 40. The cooling fluid inlets 62 and cooling fluid outlets 64 may be circumferentially aligned with each other and with the cooling fluid inlets 30 and cooling fluid outlets of the cooling jacket 14 for ease of connection of coolant.

The cover plate 58 may be mounted to the base element 54 in any suitable manner. For example, the cover plate 58 may be welded or brazed to the base element 54. To facilitate positioning, the cover plate 58 may be received on a recess 66 formed around the groove 56. If necessary, a seal means (not shown) may be provided between the cover plate 58 and the base element 54.

In a manner similar to the cooling jacket 14, the at least one cooling passage 60 of the cooling plate 40 may comprise heat transfer enhancement features 68 to enhance heat transfer from the core 4 and windings 8 into the coolant circulating through the cooling plate 40. The heat transfer enhancement features 68 extend across the cooling passage 60, in this case completely across the cooling passage 60 so as to extend between the base element 54 and the cover 88. In other embodiments, however, the heat transfer enhancement features 68 need not extend completely across the cooling passage 60.

Figure 4:
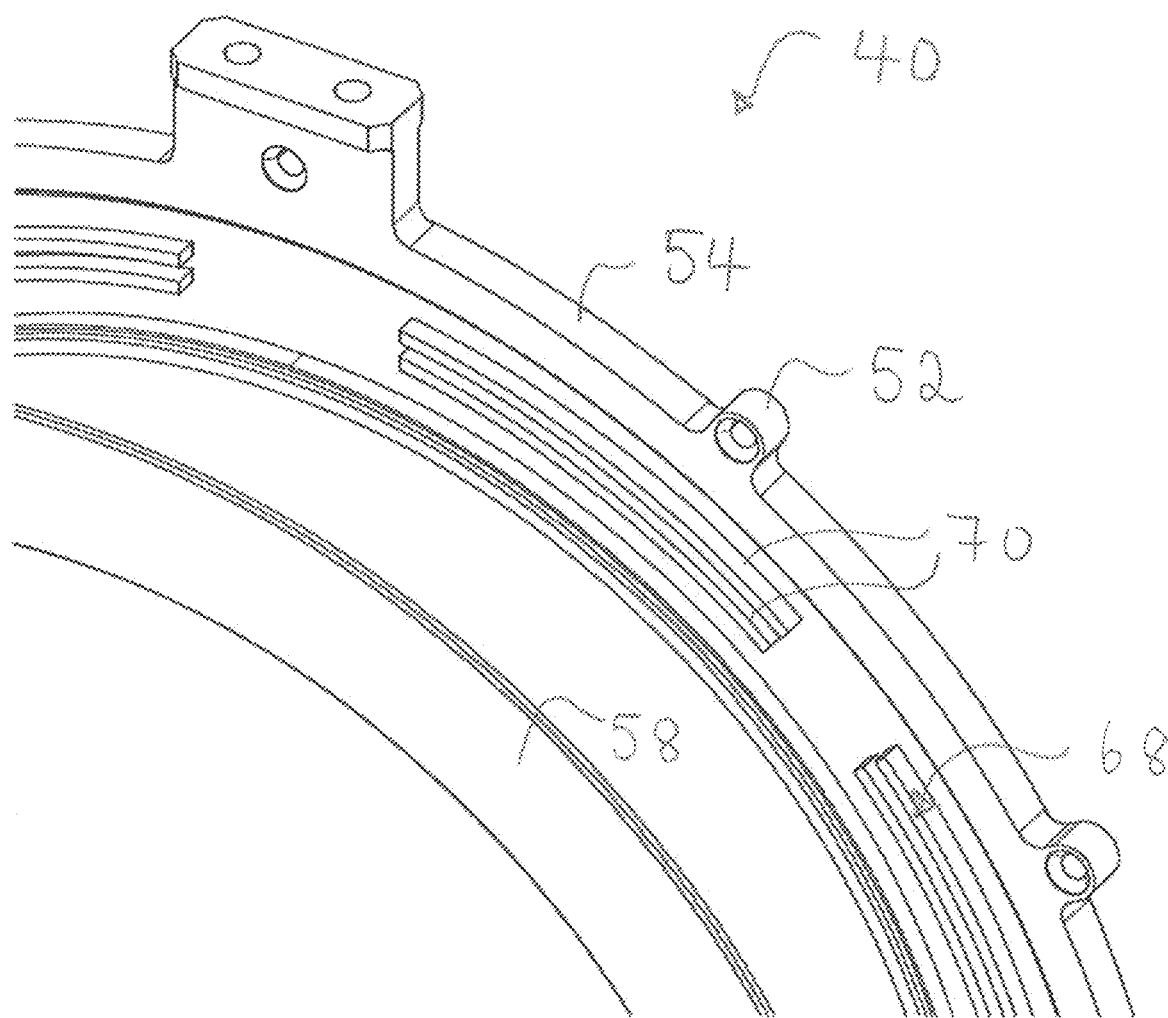
FIG. 4 shows a detail of a further embodiment of a cooling plate usable in the stator assembly of FIG. 1.

As shown in FIG. 4, in one embodiment the heat transfer enhancement features 68 may comprise a plurality of circumferentially extending ribs 70. The particular arrangement of the ribs 70 can be chosen by the skilled person to provide the necessary cooling requirements.

Figure 5:
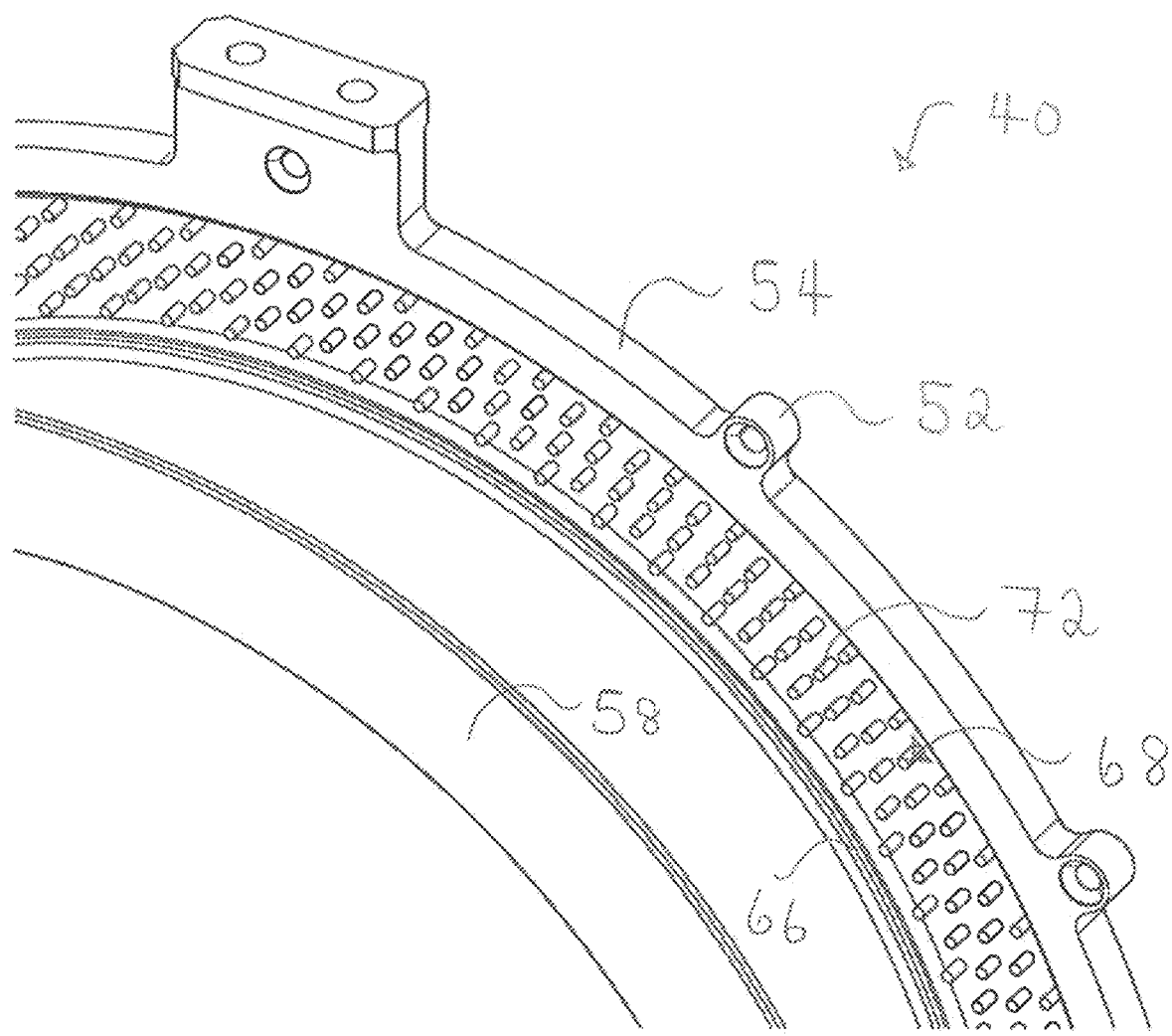
FIG. 5 shows a detail of a second embodiment of cooling plate usable in the state assembly of FIG. 1.

In another embodiment, illustrated in FIG. 5, the heat transfer enhancement features 68 are in the form of pin fins 72. The pin fins 72 may have a circular cross-sectional shape as illustrated. However, the pin fins 72 may have other cross-sectional shape such as square, rectangular, diamond-shaped, oval or teardrop shaped. Again the particular arrangement of the pin fins 72 can be chosen by the skilled person to provide the necessary cooling requirements.

Of course other configurations of heat transfer enhancement features 68 may be envisaged, for example a combination of ribs 70 and pin fins 72.

The heat transfer enhancement features 68 have been shown in the illustrated embodiment as being formed in the base element 64. They could, for example, be machined into the base element 64. In other embodiments, heat transfer enhancement features 68 may be provided either alternatively or additionally on the cover plate 58.

As can be seen from FIG. 3, the cooling plates 40 are arranged in thermal contact with the end portions 10 of the windings 8. In particular, the cooling plates 40 are arranged in thermal contact with axially outwardly facing end surfaces 80 of the end portions 10 of the windings 8. The cooling plates 40 may directly contact the end portions of the windings 8 as shown such that there is direct thermal contact therebetween. In other embodiments, however, a heat transfer medium may be provided between the cooling plates 40 and the windings 8.

To improve thermal contact, the end surfaces 80 of the end portions 10 of the windings 8 may be shaped so as to be complementary to the opposite surfaces 82 of the cooling plates 40. For example, as shown in this embodiment, the end surfaces 80 of the end portions 10 of the windings 8 may be flat such that there is a planar engagement with the opposite surfaces 82 of the cooling plates 40. As will be described further below, this may be achieved during assembly of the cooling plates 40 to the stator 2.

The cooling plates 40 may be manufactured from a material having good thermal conductivity. Thus, for example, the cooling plates 40 may be manufactured from aluminium or aluminium alloys in certain embodiments.

Having described the structure of the stator 2, its assembly will now be described.

As a first step, the core 4 may be assembled into the cooling jacket 14. As discussed above, the core 4 may be retained in the cooling jacket 14 by various suitable means. The core 4 may advantageously be wound with its windings 8 prior to assembly into the cooling jacket 14. The cooling jacket 14 may be preassembled prior to fitting of the core 4, allowing it to be tested for leakage etc. prior to assembly.

The cooling plates 40 may then be attached to the opposed axial ends 42 of the cooling jacket 14.

In an advantageous embodiment, the cooling plates 40 are preassembled into respective units prior to fitting to the cooling jacket 14. Thus, the cover plate 58 may be mounted over and close the groove 56 in the base element 54 and secured in place. This will allow the cooling plates 40 to be tested, for example for leakages prior to assembly into the cooling jacket 14, for example by a supplier.

The cooling plates 40 are attached to the cooling jacket 14 by the fasteners 44. The cooling plates 40 contact the end surfaces 80 of the end portions 10 of the windings 8 during assembly. Tightening of the cooling plates 40 against the cooling jacket 14 may act to deform the end surfaces 80 into conformity with the contour of the inner surface 82 of the cooling plate 40 in order to improve heat transfer therebetween. Of course the axially facing end surfaces 80 may be curved, without flat regions.

Once assembled, the stator 2 may be tested electrically and hydraulically prior to its assembly into a machine. This means that only one fully tested component need to be assembled to the machine instead of multiple components requiring individual testing. This represents a significant time-saving during production.

Should it become necessary to repair or maintain the stator 2, the cooling plates 40 may be removed from the cooling jacket 14 for maintenance and also to provide access to the core 4 and windings 8. If necessary the cooling plates 40 may be replaced. This is easily achieved due to the modular nature of the design.

It will be seen from the above that the disclosure provides a stator construction which provides improved cooling by means of cooling plates mounted to a cooling jacket and in close thermal contact with end portions of the stator winding. The modular nature of the construction allows its easy assembly and, if necessary, pretesting of system components prior to assembly. It also allows for easy removal of any faulty component without the need to scrap an entire assembly.

It will be understood that the embodiment disclosed is merely exemplary and that modifications may be made to it without departing from the scope of the disclosure.

Thus, for example, while the cooling plates 40 have been described as being made from two parts assembled together to define a cooling passage, the cooling passage could be formed in some other way. For example, the cooling passage may be formed e.g. cast into a unitary plate structure, or may be made by additive manufacturing. Also, the particular shape and configuration of the cooling passage may vary from embodiment to embodiment.

Also, while the cooling plates 40 have been described as being mounted to the cooling jacket 14, they may be mounted to some other structure of the stator assembly 2 such as a housing, for example if a cooling jacket is not present. However, as mentioned above, mounting to a cooling jacket 14 is advantageous in that the cooling jacket 14 provides a robust mounting location for the cooling plate 40 as well as potentially allowing for heat transfer from the cooling plate 40.

The invention claimed is:

1. A stator assembly for an electrical machine, the stator assembly comprising:
   an annular core extending around an axis (X) and comprising a plurality of axially extending slots;
   a plurality of electrical windings arranged in the slots and having end portions arranged at the axial ends of the core; and
   at least one annular cooling plate mounted at an axial end of the core and arranged in thermal contact with axially outwardly facing end surfaces of the end portions of the electrical windings, wherein:
   the at least one annular cooling plate is a flat annular cooling plate which provides a flat axially facing surface that abuts against the axially outwardly facing end surfaces of the end portions of the electrical windings;
   the at least one annular cooling plate is removably mounted to the stator assembly; and
   the at least one annular cooling plate comprises a cooling passage configured to carry a cooling fluid, the cooling passage being enclosed by and contained within the at least one annular cooling plate such that the axially outwardly facing end surfaces of the end portions of the electrical windings are spaced apart from the cooling passage by the at least one annular cooling plate, the at least one annular cooling plate being arranged in direct contact with the axially outwardly facing end surfaces of the end portions of the electrical windings.

2. The stator assembly of claim 1, further comprising a cooling jacket at least partially extending around a radially outer surface of the core, the at least one annular cooling plate being mounted to an axial end of the cooling jacket.

3. The stator assembly of claim 2, wherein the at least one cooling plate is removably mounted to the cooling jacket.

4. The stator assembly of claim 3, wherein the at least one annular cooling plate is removably mounted via a threaded fastener.

5. The stator assembly of claim 2, wherein the cooling jacket comprises an annular radially inner part and an annular radially outer part which together define at least one coolant passage therebetween.

6. The stator assembly of claim 1, comprising a respective cooling plate provided at each axial end of the stator.

7. The stator assembly of claim 1, wherein the at least one cooling plate comprises a base element defining a groove and a cover attached to the base element for closing the groove to form the cooling passage.

8. The stator assembly of claim 1, wherein the at least one annular cooling plate comprises heat transfer enhancement features which extend into the cooling passage, optionally extending completely across the cooling passage.

9. The stator assembly of claim 8, wherein the heat transfer enhancement features comprise ribs and/or pin fins, wherein optionally the pin fins comprise a square, rectangular, diamond shaped, oval or teardrop cross-section.

10. The stator assembly of claim 1, wherein the at least one annular cooling plate comprises at least one cooling fluid inlet and at least one cooling fluid outlet, and wherein, optionally, the at least one fluid inlet is located on a diametrically opposite side of the at least one annular cooling plate from the at least one fluid outlet.

11. The stator assembly of claim 1, wherein the at least one annular cooling plate is formed from aluminium.

12. A method of assembling a stator assembly for an electrical machine, the stator assembly comprising an annular core extending around an axis (X) and comprising a plurality of axially extending slots; and a plurality of electrical windings arranged in the slots and having end portions at axial ends of the core, at least one annular cooling plate being a flat annular cooling plate which provides a flat axially facing surface that abuts against axially outwardly facing end surfaces of the end portions; the method comprising:

mounting the at least one annular cooling plate at an axial end of the core and in direct thermal contact with axially facing surfaces of the end portions of the electrical windings;

removing the at least one annular cooling plate to carry out maintenance on the stator assembly; and providing a cooling passage in the at least one annular cooling plate, the cooling passage configured to carry a cooling fluid, the cooling passage being enclosed by and contained within the at least one annular cooling plate such that axially outwardly facing end surfaces of the end portions of the electrical windings are spaced apart from the cooling passage by the at least one annular cooling plate.

13. The method of claim 12, wherein attaching the at least one annular cooling plate at an axial end of the core comprises mounting the at least one annular cooling plate to a cooling jacket which at least partially extends around a radially outer surface of the core, optionally removably attaching the at least one annular cooling plate to the cooling jacket for example using threaded fasteners.

14. The method of claim 12, further comprising leak testing and/or electrically testing the assembled stator assembly after attaching the at least one annular cooling plate to the stator assembly.

\* \* \* \* \*